United States Patent [19]

Takakura et al.

[11] Patent Number: 5,682,971
[45] Date of Patent: Nov. 4, 1997

[54] FRICTION PLATE FOR HIGH OIL PASSAGE AND COOLING

[75] Inventors: Norio Takakura; Han Zhi-peng, both of Hokkaido, Japan

[73] Assignee: Dynax Corporation, Hokkaido, Japan

[21] Appl. No.: 653,859

[22] Filed: May 28, 1996

[51] Int. Cl.$^6$ ............................................. F16D 13/60
[52] U.S. Cl. .......................... 192/107 R; 192/70.12; 192/113.36
[58] Field of Search .................. 192/107 R, 113.34, 192/113.36, 70.12

[56] References Cited

U.S. PATENT DOCUMENTS

| | | | |
|---|---|---|---|
| 3,048,250 | 8/1962 | Kershner | 192/113.36 X |
| 3,094,194 | 6/1963 | Kershner | 192/113.36 X |
| 4,995,500 | 2/1991 | Payvar | 192/107 R |
| 5,101,953 | 4/1992 | Payvar | 192/107 R |

Primary Examiner—Andrea L. Pitts
Attorney, Agent, or Firm—Quarles & Brady

[57] ABSTRACT

A friction plate for a friction engagement device has a pattern of grooves in the surface thereof. In one embodiment, radial grooves are inclined from the inner edge of the plate to the outer edge which divide the plate into friction material segments. A pair of radially spaced connecting grooves traverse each segment to connect the radial grooves which define the segment, and are staggered radially from the pairs of connecting grooves of the adjacent segments, so that the grooves of adjacent pairs alternate in radial location across the radial groove which divides them. In another embodiment, tangential grooves form a regular polygon inscribing the outer edge of the friction plate. In both embodiments, oil traverses the surface of the plate from the inner diameter edge to the outer diameter edge by a serpentine route alternating between the radial grooves and the connecting or tangential grooves.

2 Claims, 4 Drawing Sheets

FRICTION PLATE FOR HIGH OIL PASSAGE AND COOLING

BACKGROUND OF THE INVENTION

1. Field of the Invention

The present invention relates to a friction plate of a friction engagement device to be used in an automatic transmission or other device in which mating plates and the friction plates are alternately arranged. More particularly, the present invention relates to a friction plate best suited for use in a friction engagement device in which the mating plate is constantly rotating.

2. Discussion of the Prior Art

A friction engagement device for use in an automatic transmission has friction plates and mating plates which are alternately arranged. When a piston is actuated with a hydraulic pressure, the friction plate and the mating plate are engaged to transmit a torque. The friction engagement device is usually used in oil and therefore oil is held in the automatic transmission housing.

The oil to be used in the friction engagement device is for cooling the friction plates and the mating plates and for lubricating peripheral equipment. A groove for oil recirculation is usually formed in the friction plates. Cooling and lubrication effects depend largely upon the shape of this groove.

To improve the friction plate and mating plate cooling effect, a groove preferably divides the friction material on the friction plate surface into small segments. For example, a grid-like groove may be used for this purpose, as shown in FIG. 4, fourth row. On the other hand, to improve the effect of lubricating the peripheral equipment, it is preferable to adopt a groove of such a shape that allows the flow of more oil on the friction plate surface. In this case, radial grooves are often adopted, as shown in FIG. 4, third row.

However, dividing the friction material into small segments for the purpose of improving the cooling effect restricts the oil flow, resulting in insufficient lubrication of the peripheral equipment. On the other hand, if radial grooves are provided in the surface of the friction material for the purpose of improving the lubrication effect of the peripheral equipment, oil passage will be accelerated, deteriorating the cooling effect of the friction plate and the mating plate. Thus, respecting friction plates, the acceleration of oil passage and the acceleration of cooling are generally incompatible with each other.

It is, therefore, an object of the present invention to provide a friction plate having a groove form which can simultaneously satisfy both the cooling of the friction plate and mating plate and the lubrication of peripheral equipment.

SUMMARY OF THE INVENTION

The present invention provides a solution to the above-described needs by the use of a friction plate in which a friction material is secured on a core plate and provided with grooves of a particular structure in the surface. The grooves comprise a plurality of radial grooves inclined from the inner edge toward the outer edge of the friction material and connecting grooves mutually connecting adjacent ones of the radial grooves. The connecting grooves in adjacent friction material segments are divided by the radial grooves and are staggered from the connecting grooves in adjacent segments of the friction material.

The present invention is suitable for use in a friction engagement device of such a type that a mating plate is constantly rotating. As the mating plate is rotating, oil flowing through the friction plate is imparted with a force based on viscosity (a frictional force) from the mating plate. This force is a resultant of a centrifugal force and a tangential force. However, as the friction plate is not rotating, the tangential force is greater than the centrifugal force. The resultant force, therefore, tends to force the oil to flow along the radial groove and then the connecting groove. The oil at the outlet of the connecting groove flows along the next adjacent radial groove, and then flows along the connecting groove of the adjacent segment of the friction material. The oil continues this process until it reaches the outer edge of the plate.

Thus, as the mating plate is rotating, the oil at the inner edge of the friction material flows first along the radial groove. The oil thus flowing along the radial groove is branched off to the connecting groove at a branch point, tending to flow mainly along the connecting groove. This is because the oil is imparted with a great tangential force as stated above. When the oil flowing along the connecting groove has reached a branch point where the connecting groove meets the next radial groove, the oil starts flowing toward the outer edge along the radial groove, until another branch point is reached with a connecting groove. Having reached a branch point with a connecting groove, the oil will then tangentially flow mainly along the connecting groove. The oil thus flowing along the radial and connecting grooves is led out to the outer edge of the friction plate, flowing generally diagonally across the surface of the friction material.

In a second aspect, the present invention satisfies these needs by the use of a friction plate with grooves in the pattern of a plurality of radial grooves inclined from the inner edge toward the outer edge of the friction material and a plurality of tangential grooves which form a polygon approximately inscribing the outer edge of the friction plate. In this aspect, as the mating plate is rotating, oil at the friction plate receives a force, dependent on viscosity (frictional force), from the mating plate. As the friction plate is not rotating, although this force is a resultant of a centrifugal force and a tangential force, the tangential force is greater than the centrifugal force. This resultant force forces the oil to flow first toward the outer edge along the radial groove which is inclined, and then in the direction of rotation of the mating plate along the tangential groove.

Thus, in this aspect, with the mating plate rotating, the oil at the inner edge of the friction material first flows into the surface of the friction material along the radial groove. The oil flowing along the radial groove flows out mostly along the tangential groove at a branch point where the radial groove meets the tangential groove, and partly in the direction of the outer edge along the radial groove. The oil is led out to the outer edge of the friction material by the rotation of the mating plate notwithstanding its flowing along the fine grooves formed in the surface of the friction material.

DETAILED DESCRIPTION OF THE PREFERRED EMBODIMENTS

Figure 1:
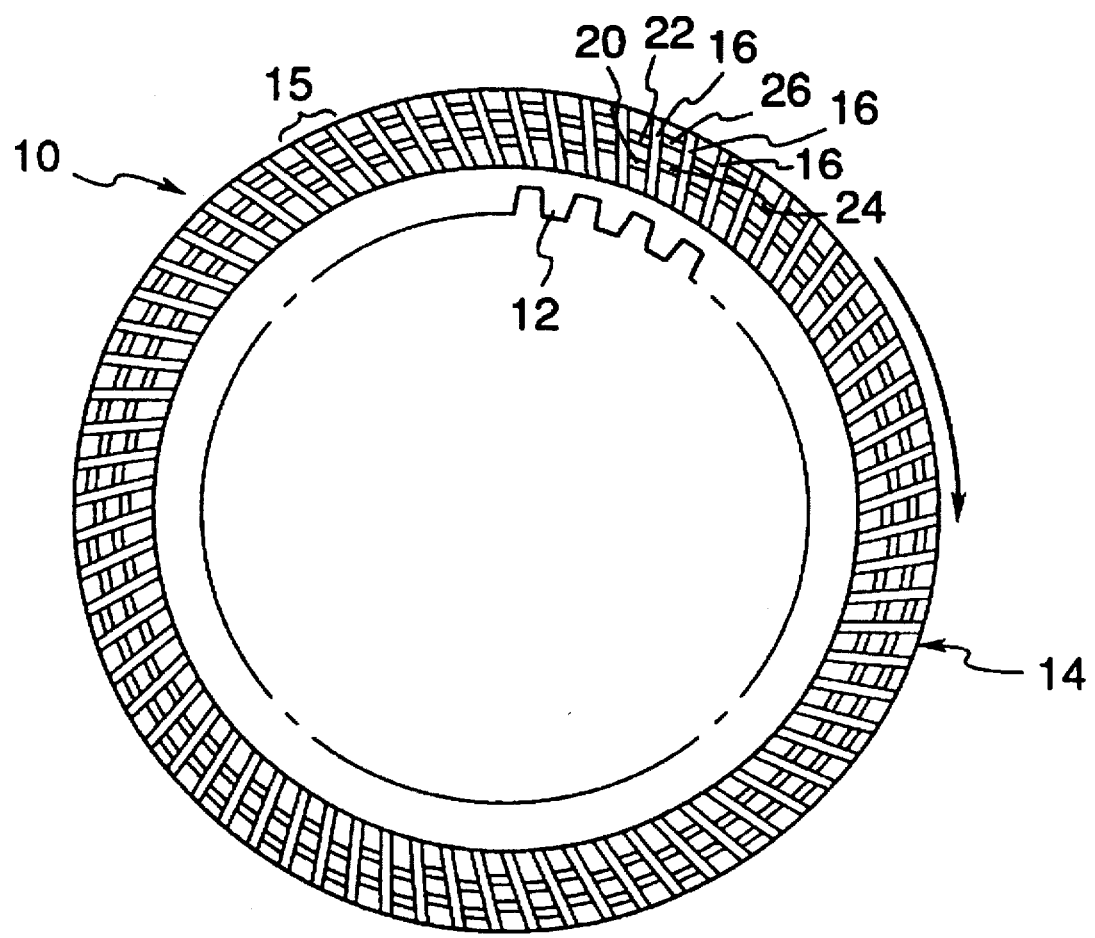
FIG. 1 is a plan view showing a first embodiment of a friction plate according to the present invention.
Figure 3:
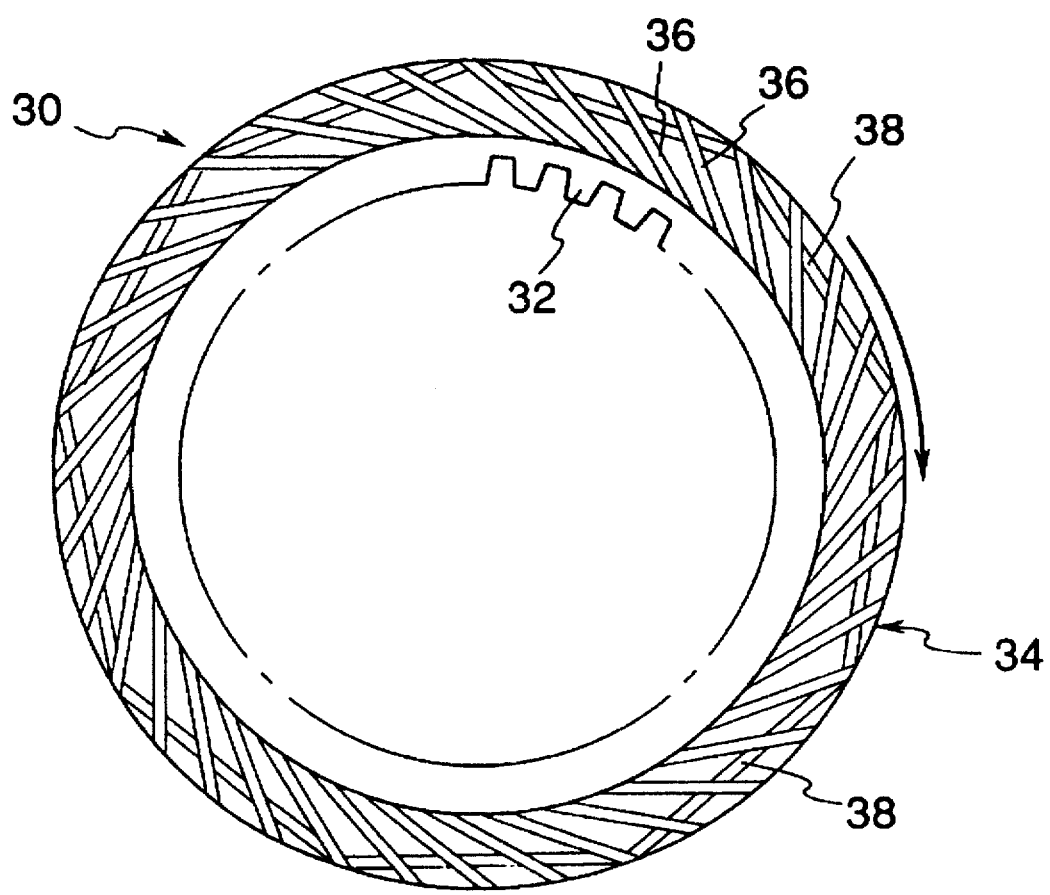
FIG. 3 is a plan view showing a second embodiment of a friction plate according to the present invention.

Hereinafter preferred embodiments of the present invention will be explained with reference to the accompanying drawings. FIG. 1 shows a first embodiment of a friction plate according to the present invention; and FIG. 3 shows a second embodiment of a friction plate according to the present invention.

A friction plate 10 of FIG. 1 has a core plate 12 and a friction material 14 fastened on both sides of the core plate. A friction engagement device (not shown) incorporating the friction plate 10 consists of a plurality of plates 10, which are alternately arranged with a plurality of mating plates (not shown). On the surface of the friction material 14 are formed radial grooves 16 and connecting grooves 20, 22, 24 and 26. The radial grooves 16 and the connecting grooves 20, 22, 24 and 26 are formed by a press-forming process and sometimes by adhering a segmented friction material on the core plate 12.

The radial grooves 16 thus formed range from the inner edge through to the outer edge of the friction material 14. The friction material 14 is divided into a plurality of friction material segments 15 by the radial grooves 16.

The radial grooves 16 incline in the same direction on both sides of the friction material 10. When the friction plate 10 is fitted, for example, in a hub spline, the radial grooves 16 will be inclined in either the clockwise or counterclockwise direction. The cross-sectional shape of the radial grooves 16 in the friction plate 10 of the present embodiment is semi-circular, but they could be any suitable shape to practice the invention.

The connecting grooves 20, 22, 24 and 26 are formed in their respective friction material segments 15. The connecting grooves 20, 22, 24 and 26 in the present embodiment are tangential grooves connecting adjacent radial grooves 16, 16, and may be circumferential grooves concentric with the friction plate 10.

The connecting grooves 20, 22, 24 and 26 are formed with two in each friction material segment 15. However, the number of the connecting grooves in each friction material segment 15 may be one, or three or more, and furthermore may be different from that of adjacent friction material segments 15.

What is important in the connecting grooves is that the connecting grooves 20 and 22 in one friction material segment 15 are staggered in relation to the connecting grooves 24 and 26 in the adjacent friction material segments 15 in the radial direction on both sides of the radial grooves 16.

The friction plate 10 of the present embodiment is suitable for use in a friction engagement device of such a type that the mating plate which mates with the friction plate 10 is constantly rotating. The friction plate 10 is attached so that the radial grooves 16 will be inclined in the same direction as the direction of rotation of the mating plate. The arrow mark in FIG. 1 indicates the direction of rotation of the mating plate.

As the mating plate rotates, the oil present between the friction plate 10 and the mating plate is imparted with a force, dependent on viscosity (frictional force), by the mating plate. This force is a resultant of a centrifugal force and a tangential force. Since the friction plate 10 is not rotating, the tangential force is greater than the centrifugal force. The oil present in the vicinity of the inner edge of the friction material 14 flows from openings at the inner edge of the radial grooves 16 onto the surface of the friction material 12 along the radial grooves 16. Also, the oil in the radial grooves 16 tends to flow along the inclination toward the outer edge, while the oil in the connecting grooves 20, 22, 24 and 26 tends to flow tangentially.

Figure 2:
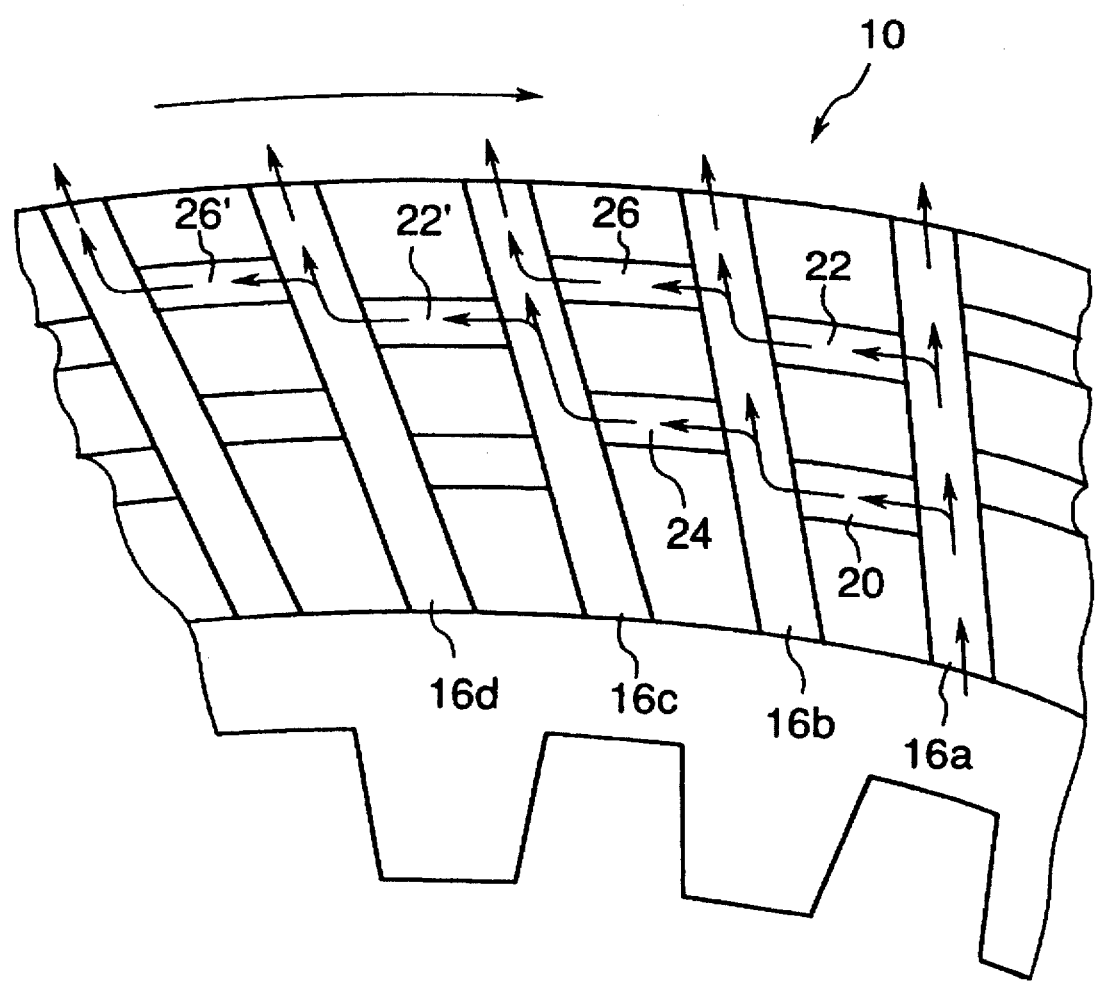
FIG. 2 is an enlarged plan view showing the flow of oil at the friction plate of FIG. 1.

FIG. 2 shows the route by which the oil that has flowed from the opening of the inner edge of one radial groove 16 onto the surface of the friction material will reach the outer edge of the friction plate 10. As is clear from the drawing, the oil flowing along the radial groove 16a tends to flow mainly along the connecting groove 20 from a branch point to the connecting groove 20. The oil flows partly in the direction of the outer edge in the radial groove 16a. The oil flowing along the connecting groove 20, that has reached the radial groove 16b, flows along the radial groove 16b as far as a branch point to the connecting groove 24, where the oil tends to flow mainly along the connecting groove 24. A part of the oil flows in the direction of the outer edge in the radial groove 16b. Furthermore, the oil flows in a similar manner between the radial groove 16a and the connecting groove 22, between the radial groove 16b and the connecting groove 26, between the radial groove 16c and the connecting groove 22', and between the radial groove 16d and the connecting groove 26'.

Oil flow along the connecting grooves 20, 22, 24 and 26, as described above, is accelerated by the rotation of the mating plate; and the rotation of the mating plate leads the oil out to the outer edge of the friction plate 10. The oil, flowing obliquely across the friction material 12, is rapidly led out to the outer edge of the friction plate 10 while cooling the surface of the friction material.

Similar to the embodiment of FIG. 1, in the embodiment of FIG. 3, a friction plate 30 has a core plate 32 and friction material 34 fastened on both of its sides. A plurality of friction plates 30 are alternately arranged with mating plates (not shown) to make a friction engagement device (not shown). In the surface of the friction material 34 are formed radial grooves 36 and tangential grooves 38. The radial grooves 36 are formed from the inner edge through to the outer edge of the friction material 14. The grooves 36 and 38 have a semi-circular cross-section, but the invention is not limited to any particular cross-sectional shape of the grooves.

The tangential grooves 38 are grooves which are open at both ends thereof in the end sections of the radial grooves 36 in the vicinity of the outer edge of the friction material 34. The tangential grooves 38 of the present embodiment are open in the end sections of the radial grooves 36 but the invention is not limited to such a construction and the tangential grooves 38 alone may have openings in the outer edge of the friction plate.

Adjacent ends of the tangential grooves 38, at the outer edge of the friction material 34, are open at the end sections of the radial grooves 36 without mutually crossing each other. In the friction plate 30 of FIG. 3, nine tangential grooves 38 form a regular nonagon inscribing the outer edge of the friction plate 30. The tangential grooves 38, as described above, are so arranged as to form a regular polygon which approximately inscribes the outer edge of the friction plate 30.

With the rotation of the mating plate, oil flows from the inner edge of the friction material 34 onto the surface of the friction material along the radial grooves 36. The oil thus having reached the tangential grooves 38 flows toward the outer edge of the friction material 34 along both the radial grooves 36 and the tangential grooves 38.

Figure 4:
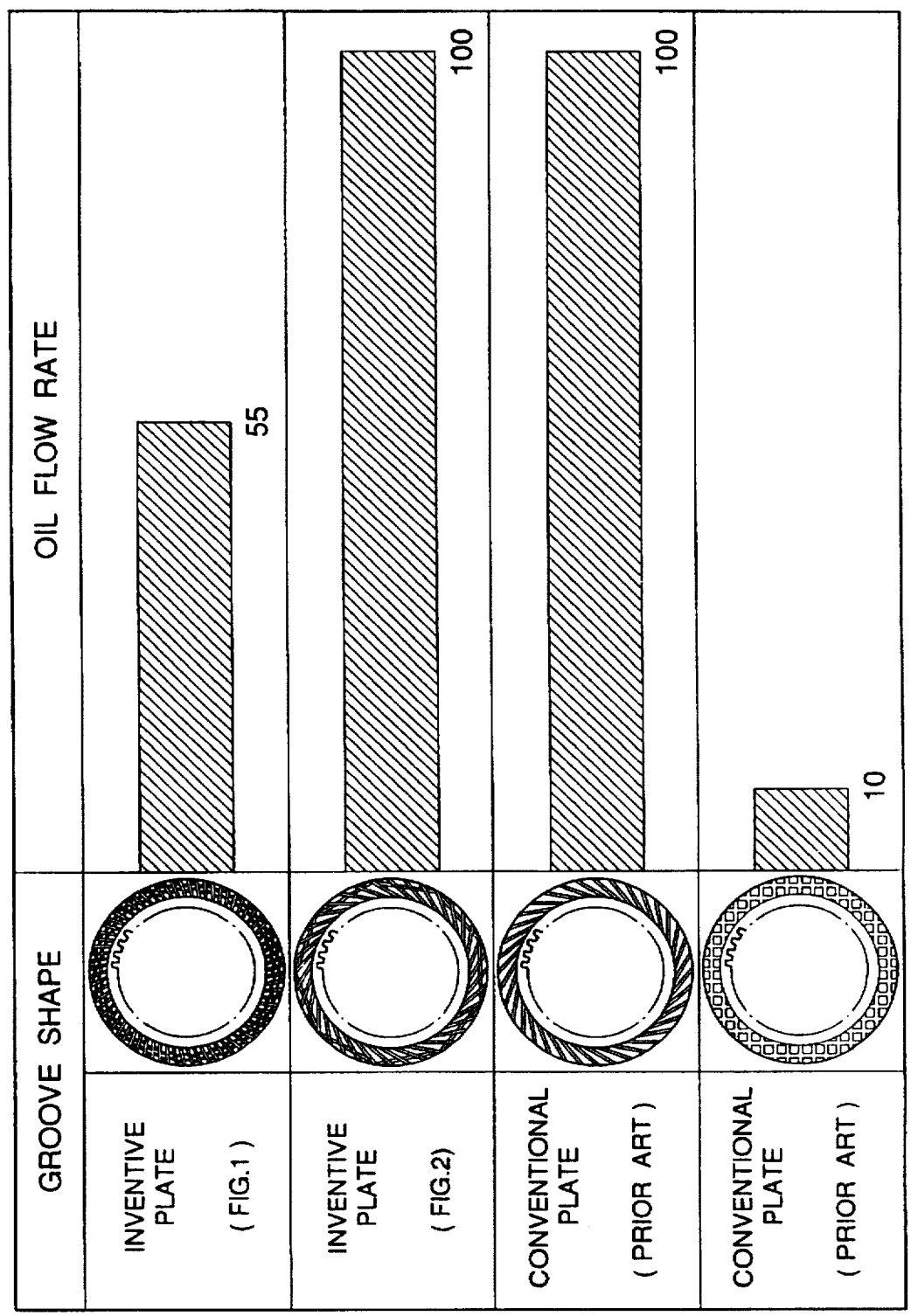
FIG. 4 is a comparison graph for comparing the quantity of oil passage between the friction plates of the present invention and conventional friction plates.

FIG. 4 is a graph giving relative oil flow rates at conventional friction plates, one having grid-like grooves and the other having only radial grooves, and the friction plates of the present invention. From FIG. 4, it is clear that the friction plate 10 of FIG. 1 allows the passage of a lower flow rate than the conventional friction plate having the simple inclined grooves, but allows a higher rate of passage of oil than the conventional friction plate having the grid-like pattern. However, the friction plate 30 of FIG. 2 achieves the passage of as much oil as the conventional friction plate having the simple inclined grooves.

The friction plates 10 and 30 of the present invention, however, have connecting or tangential grooves in the surface of the friction material; therefore, in addition to a comparable rate of oil passage as in the conventional friction plate, the friction plates are effective for improved cooling of the friction materials.

The invention accomplishes this by passing the oil along the radial grooves and the connecting grooves by utilizing the pressure imparted to the oil by rotation of the mating plate in relation to the friction plate. It is, therefore, possible to pass a large quantity of oil from the inner edge toward the outer edge of the friction material and also to effectively cool the surface of the friction material.

We claim:

1. A friction plate comprising a friction material secured on a core plate and formed with grooves in the surface, wherein said grooves include a plurality of radial grooves which are inclined from the inner edge toward the outer edge of said friction material and divide said friction plate into friction material segments, and connecting grooves extending through said segments which connect adjacent radial grooves with each other, wherein said connecting grooves in one friction material segment are divided by radial grooves from said connecting grooves in adjacent friction material segments, and said connecting grooves in said friction material segments are radially staggered from said connecting grooves in adjacent friction material segments.

2. A friction plate comprising a friction material secured on a core plate and formed with grooves in a surface, wherein said grooves are composed of a plurality of radial grooves which are inclined from an inner edge of said friction material toward an outer edge of said friction material, and a plurality of tangential grooves, said tangential grooves having ends which intersect at said outer edge said friction material so that said tangential grooves form a polygon having corners at an outer edge of said friction plate.

* * * * *